United States Patent
Molenaar

(10) Patent No.: US 11,552,582 B2
(45) Date of Patent: Jan. 10, 2023

(54) SETPOINT IDENTIFICATION ON RETROFIT ELECTRIC ACTUATION

(71) Applicant: Woodward, Inc., Fort Collins, CO (US)

(72) Inventor: Gregory A. Molenaar, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 276 days.

(21) Appl. No.: 16/901,639

(22) Filed: Jun. 15, 2020

(65) Prior Publication Data
US 2021/0388856 A1    Dec. 16, 2021

(51) Int. Cl.
 *H02P 6/28* (2016.01)
 *H02P 6/16* (2016.01)
 *H02P 6/08* (2016.01)

(52) U.S. Cl.
CPC . *H02P 6/16* (2013.01); *H02P 6/08* (2013.01)

(58) Field of Classification Search
CPC .... H02P 6/16; H02P 6/08; G05B 9/03; H02M 7/53873
See application file for complete search history.

(56) References Cited

U.S. PATENT DOCUMENTS

| | | | |
|---|---|---|---|
| 6,016,832 A | 1/2000 | Vars et al. | |
| 7,549,407 B2 | 6/2009 | Krupadanam | |
| 7,789,067 B2 | 9/2010 | Benassi et al. | |
| 8,016,581 B2 | 9/2011 | Vasapoli et al. | |
| 8,253,290 B2 | 8/2012 | Davis | |
| 8,290,631 B2 * | 10/2012 | Sweeney | G05B 9/03 251/30.01 |
| 2008/0041976 A1 | 2/2008 | Bohlmann | |
| 2010/0115853 A1 * | 5/2010 | Gebhart | H02P 6/28 49/506 |
| 2011/0083747 A1 | 4/2011 | Orino et al. | |
| 2017/0283040 A1 | 10/2017 | Judey | |
| 2018/0245565 A1 | 8/2018 | St-Laurent et al. | |
| 2018/0351483 A1 * | 12/2018 | Arisawa | H02M 7/53873 |
| 2019/0263533 A1 | 8/2019 | Nierlich et al. | |

FOREIGN PATENT DOCUMENTS

| | | |
|---|---|---|
| WO | WO2016145541 | 9/2016 |
| WO | WO2018041494 | 3/2018 |

OTHER PUBLICATIONS

PCT International Search Report and Written Opinion in International Appln. No. PCT/US/2021/037192, dated Sep. 22, 2021, 14 pages.

* cited by examiner

*Primary Examiner* — Cortez M Cook
(74) *Attorney, Agent, or Firm* — Fish & Richardson P.C.

(57) ABSTRACT

The subject matter of this specification can be embodied in, among other things, an electric actuator driver that includes a first input port configured to receive an analog electrical servo control signal, a second input port configured to receive a position feedback signal, a first output port, a second output port, and a conversion circuit configured to determine one or more electric motor coil control current levels based on the analog electrical servo control signal and the position feedback signal, provide the one or more electric motor coil control currents based on the determined electric motor coil control current levels at the first output port, determine a feedback signal based on the analog electrical servo control signal, and provide the determined feedback signal at the second output port.

20 Claims, 8 Drawing Sheets

SETPOINT IDENTIFICATION ON RETROFIT ELECTRIC ACTUATION

TECHNICAL FIELD

This instant specification relates to control of electric actuators, and more specifically electric actuators for retrofitting hydraulic actuators.

BACKGROUND

Hydraulic prime mover controllers are used to control hydraulic actuators in many different types of applications, such as fuel metering valves and variable geometry valves. However, hydraulic controllers and actuators present several failure modes that are unique to hydraulic actuation. These older control systems were designed and built to drive a bi-directional hydraulic servo valve and receive feedback from a variable differential transformer (VDT) or other electrical position feedback device on the hydraulic actuator. In addition, safety detection systems in these older controllers are designed to monitor and detect failures of the control system, components of the older hydraulic systems, or interface wiring.

Many older prime mover controls cannot easily be upgraded to electronic-based actuation because it is prohibitively expensive to replace or modernize the entire control system to accommodate the standard 4-20 mA proportional interfaces or digital interfaces provided on most modern electronic controllers for actuator control and feedback.

SUMMARY

In general, this document systems and techniques for retrofitting and using electric actuators that have been retrofitted into hydraulic actuator applications.

In an aspect, an electric actuator driver includes a first input port configured to receive an analog electrical servo control signal, a second input port configured to receive a position feedback signal, a first output port, a second output port, and a conversion circuit configured to determine one or more electric motor coil control current levels based on the analog electrical servo control signal and the position feedback signal, provide the one or more electric motor coil control currents based on the determined electric motor coil control current levels at the first output port, determine a feedback signal based on the analog electrical servo control signal, and provide the determined feedback signal at the second output port.

Various embodiments can include some, all, or none of the following features. The feedback signal can be an alternating current feedback signal that is emulative of a variable displacement transformer feedback signal. The feedback signal can include at least one of a first sinusoidal voltage signal having an amplitude that is proportional to the analog electrical servo control signal, and a second sinusoidal voltage signal having an amplitude that is inversely proportional to the analog electrical servo control signal. The analog electrical servo control signal can be configured as a hydraulic servo valve control signal. The analog electrical servo control signal can be an analog electrical current that varies in a range from about −10 mA to about +10 mA. The conversion circuit can include an analog to digital conversion stage configured to convert the analog electrical servo control signal to a digital signal representative of the analog electrical servo control signal, an integrator stage configured to integrate the digital signal, an emulator configured to provide the feedback signal based on the integrated signal, and an actuator controller stage configured to provide the one or more electric motor coil control currents based on the integrated signal and the position feedback signal. The feedback signal can be determined further based on a difference between an actual position, based on the position feedback signal, and a commanded position, based on the analog electrical servo control signal.

An another aspect, a method of actuator control includes receiving an analog electrical servo control signal, receiving a position feedback signal, determining one or more electric motor coil control current levels based on the analog electrical servo control signal and the position feedback signal, providing the one or more electric motor coil control currents based on the determined electric motor coil control current levels, determining a feedback signal based on the analog electrical servo control signal, and providing the determined feedback signal. The feedback signal can be an alternating current feedback signal that is emulative of a variable displacement transformer feedback signal. The feedback signal can include at least one of a first sinusoidal voltage signal having an amplitude that is proportional to the analog electrical servo control signal, and a second sinusoidal voltage signal having an amplitude that is inversely proportional to the analog electrical servo control signal. The analog electrical servo control signal can be configured as a hydraulic servo valve control signal. The analog electrical servo control signal can be an analog electrical current that varies in a range from about −10 mA to about +10 mA. The method can also include converting the analog electrical servo control signal to a digital signal representative of the analog electrical servo control signal, integrating the digital signal, providing the feedback signal based on the integrated signal, and providing the one or more electric motor coil control currents based on the integrated signal and the position feedback signal. Determining a feedback signal based on the analog electrical servo control signal can include determining a difference between an actual position, based on the position feedback signal, and a commanded position, based on the analog electrical servo control signal.

In another aspect, a method of actuator control includes identifying a hydraulic actuation system having a hydraulic servo controller circuit configured to provide an analog electrical servo control signal based on a first position feedback signal, a hydraulic actuator configured to receive the analog electrical servo control signal and actuate based on the analog electrical servo control signal, and a first position feedback sensor configured to provide the first position feedback signal based on a positional configuration of the hydraulic actuator, replacing the hydraulic actuator with an electric actuator configured to actuate based on one or more electric motor coil control currents, replacing the first position feedback sensor with a second position feedback sensor configured to provide a second position feedback signal based on a positional configuration of the electric actuator, and providing an electric actuator driver configured to (i) provide the one or more electric motor coil control currents based on the analog electrical servo control signal and the second position feedback signal, and (ii) provide the first position feedback signal to the hydraulic servo controller circuit based on the analog electrical servo control signal.

Various implementations can include some, all, or none of the following features. The first position feedback signal can be emulative of a variable displacement transformer feedback signal. The first position feedback signal can include at least one of a first sinusoidal voltage signal having an amplitude that is proportional to the analog electrical servo control signal, and a second sinusoidal voltage signal having an amplitude that is inversely proportional to the analog electrical servo control signal. The analog electrical servo control signal can be configured as a hydraulic servo valve control signal. The electric actuator driver can be further configured to convert the analog electrical servo control signal to a digital signal representative of the analog electrical servo control signal, integrate the digital signal, provide the feedback signal based on the integrated signal, and provide the one or more electric motor coil control currents based on the integrated signal and the second position feedback signal. Determining a feedback signal based on the analog electrical servo control signal can include determining a difference between an actual position, based on the position feedback signal, and a commanded position, based on the analog electrical servo control signal.

The systems and techniques described here may provide one or more of the following advantages. First, a system can provide performance characteristics of electric actuators in applications that were designed around hydraulic actuators. Second, the system can provide an upgrade path from hydraulic actuation to electric actuation with a reduced cost compared to other upgrade solutions. Third, the system can reduce the amount of alteration needed to upgrade to electric actuation. Fourth, the system can reduce the amount of time needed to upgrade to electric actuation. Fifth, the system can provide feedback and detection of electric actuator faults in a format that emulates the feedback from the replaced hydraulic actuators.

The details of one or more implementations are set forth in the accompanying drawings and the description below. Other features and advantages will be apparent from the description and drawings, and from the claims.

DETAILED DESCRIPTION

This document describes systems and techniques for retrofitting and using electric actuators that have been retrofitted into hydraulic actuator applications. In general, existing hydraulic-based systems can be upgraded to use electrical actuators in a way that is less expensive, less intrusive, and less disruptive than existing retrofit and upgrade solutions.

Figure 1:
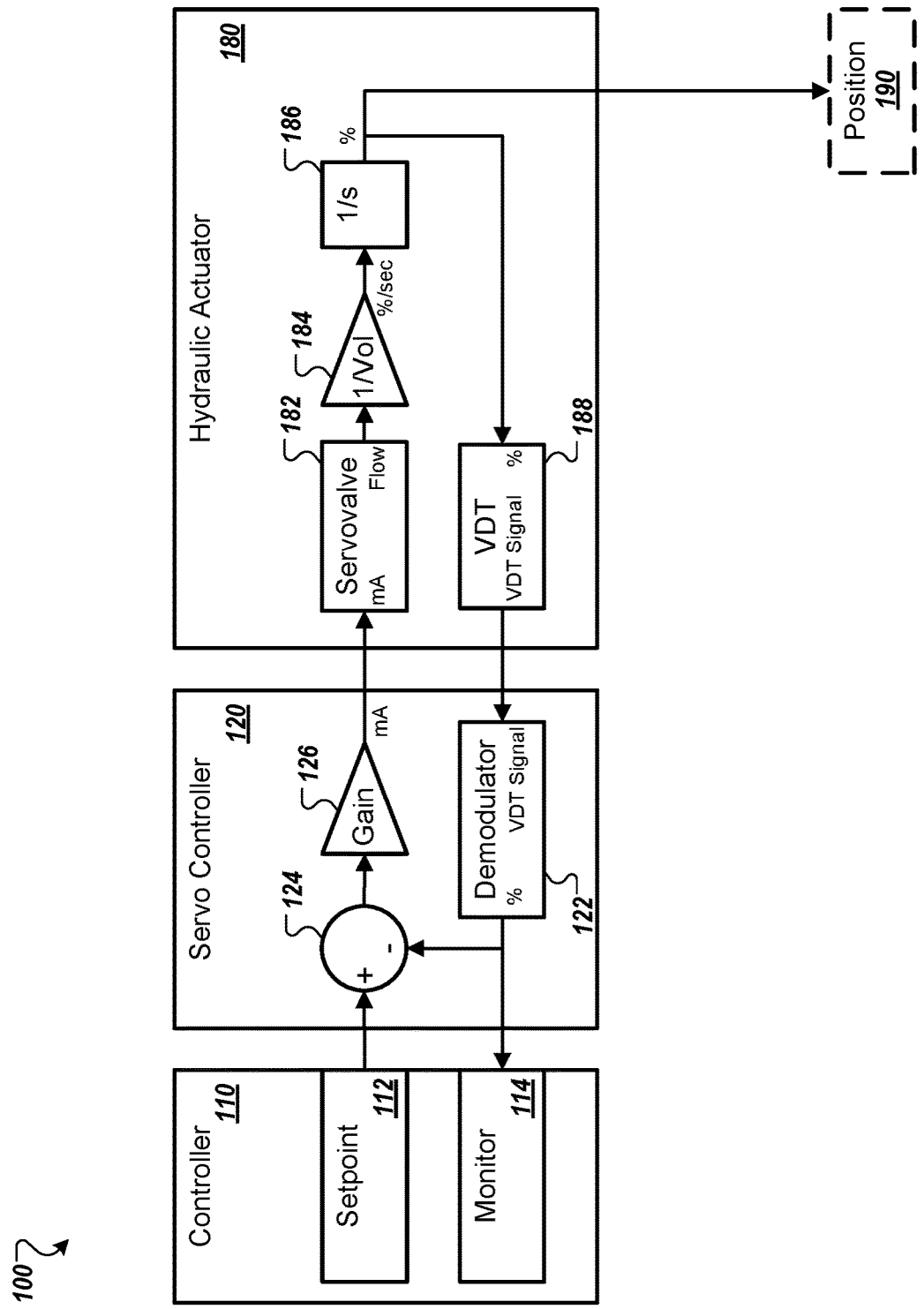
FIG. 1 is a schematic diagram that shows an example of a prior art hydraulic actuator system.

FIG. 1 is a schematic diagram that shows an example of a prior art hydraulic actuator system 100. The hydraulic actuator system 100 includes a hydraulic actuator 180 that drives a position of an output (represented as a position 190). In some implementations, the position 190 can be the position of a control valve (e.g., fuel valve) for an industrial turbine application. For the purposes of the examples that will be discussed in the remainder of this document, the hydraulic actuator system 100 is considered to be the existing hydraulic-based actuator system that is to be upgraded for use with electrical actuators.

The hydraulic actuator 180 includes a hydraulic servo valve 182 (e.g., torque motor). The hydraulic servo valve 182 is configured to receive a typical −10 mA to +10 mA drive current, and actuate and provide a hydraulic flow that is proportional to the drive current. The physical construction of the hydraulic actuator 180 provides a hydraulic gain effect, represented as 184, that is inversely proportional to the volume of a hydraulic cylinder of the hydraulic actuator 180 (e.g., 1/cylinder volume). The effective output of the gain 184 is a physical speed that is proportional to hydraulic flow from the hydraulic servo valve 182 (e.g., fraction of movement per second).

The physical construction of the hydraulic actuator 180 also provides an integrator effect, represented as 186, which totalizes the movement of the actuator (e.g., effectively transforming the amount of movement per second to an amount of movement). The total movement of the hydraulic actuator 180 results in a positional output, represented by 190 (e.g., extension position of a linear hydraulic piston, rotary position of a hydraulic rotary actuator).

A variable differential transformer (VDT) 188 is configured to provide a feedback signal that is proportional to the position 190 (e.g., an amplitude modulated AC signal which varies by position). For example, the hydraulic actuator 180 can be a linear hydraulic actuator (e.g., a linear piston), the position 190 can be a linear positon, and the VDT 188 can be a linear VDT (LVDT). For example, the hydraulic actuator 180 can be a rotary hydraulic actuator (e.g., a hydraulic motor, a rotary piston actuator, a rotary vane actuator), the position 190 can be a rotary positon, and the VDT 188 can be a rotary VDT (RVDT). In some embodiments, other forms of feedback devices, such as voltage output and current output devices, can be used in place of the VDT 188.

The hydraulic actuator 180 is controlled by a controller 110 through a servo controller 120. The servo controller 120 (e.g., a servo control card) is configured to provide closed-loop position control of the hydraulic servo valve 182 based on a position setpoint signal 112 provided by the controller 110 and on feedback signals provided by the VDT 188. The feedback signals from the VDT 188, which in some examples can have either a single sinusoidal voltage (e.g., carrier signal), where the amplitude rises with increasing position, or two outputs, one with voltage amplitude which rises with increasing position and the other sinusoidal voltage amplitude decreases with increasing position.

The feedback signals are transformed into a position feedback signal representative of the position 190 by a demodulator 122. The resulting position feedback signal is provided to a monitor circuit 114 of the controller (e.g., for display, alarms), and to a summing node 124. The summing node 124 is configured to determine a difference (e.g., error) between the position setpoint signal 112 and the position feedback signal. The difference signal is provided to an amplifier 126 and is amplified to provide drive currents in the range required by the hydraulic servo valve 182 (e.g., typically −10 mA to +10 mA). This output of the servo controller 120 is proportional to velocity.

In some implementations, the servo controller 120 can be used in a simplex, duplex, or triplex control modes. In the illustrated example, the servo controller 120 is configured to provide a −10 mA to +10 mA drive current that is typically used by hydraulic servo valves, although in some embodiments the current range can be different (e.g., based on the chosen servo valve size and type).

In general, the existing position control hardware and the existing control algorithm used in the hydraulic actuator system 100 has been qualified for use in the target application (e.g., controlling a commercial turbine engine). In the illustrated example, the controller 110 includes startup checks and error detection functions that have been tuned and refined to a high level of confidence and reliability. In the illustrated example, the hydraulic actuator system 100 has been designed specifically for good behavior under all anticipated loads, conditions, and input trajectories.

Figure 2:
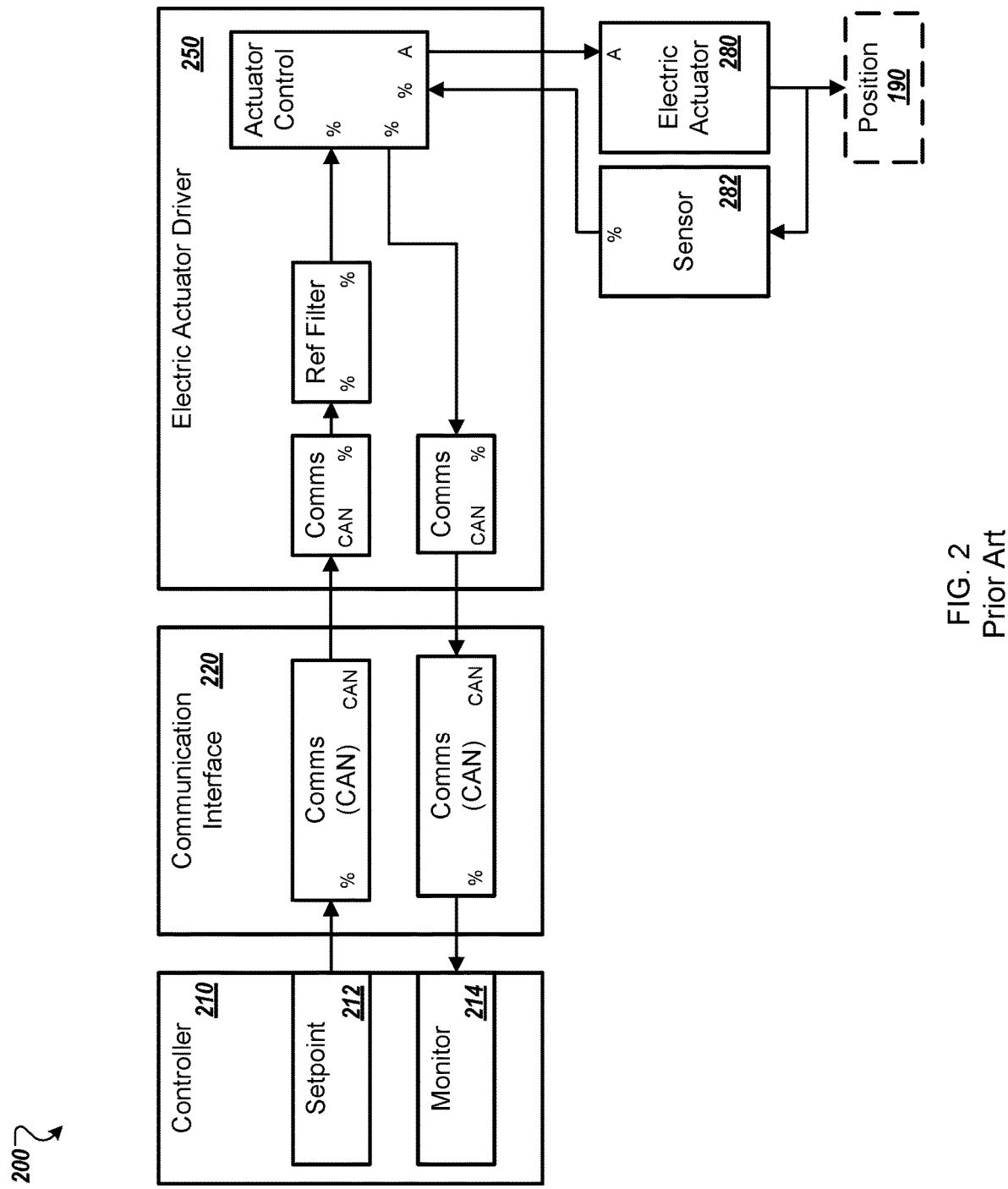
FIG. 2 is a schematic diagram that shows an example of a prior art electric retrofit assembly.

FIG. 2 is a schematic diagram that shows an example of a prior art electric retrofit assembly 200. Many owners of existing hydraulic prime mover controllers would like to upgrade from hydraulic to electric actuation, for example to upgrade fuel metering valves and variable geometry valves to improve accuracy and/or to eliminate several failure modes that are inherent in hydraulic actuators (e.g., seal failure, hydraulic circuit leakage, air in the actuating fluids). For the purposes of the examples that will be discussed in the remainder of this document, the assembly 200 is considered to be a version of the example hydraulic actuator system 100 that has been retrofitted for use with electrical actuators according to prior techniques.

Upgrading an existing hydraulic-based system, such as the hydraulic actuator system 100, with electric actuators is not a trivial task. For example, controller 110, as a full closed loop positioner that is already in use, may already be qualified on for use with existing industrial gas turbines. The position control loop may not have a separate velocity loop, and many controller algorithms are built around position control functionality, so it would be a major redesign to change the controller 110 from position-based control to velocity-based control. In another example, some electric actuators have high inertia, and would become unstable or overshoot badly on large steps if the existing servo controller 120 was tuned to the desired bandwidth. Such overshoot can be due to the high forces that may be required to stop the actuator quickly. Electric actuators have limited stopping force because of drive current limits, whereas these types of considerations are already solved in the existing controller 110 and the servo controller 120 for position control of the hydraulic actuator 180. In yet another example, requalification on each model of electric actuator may be needed if the main control loop of the controller 110 is redesigned.

In general, FIG. 2 shows an example of how the hydraulic actuator system 100 is upgraded from hydraulic to electric actuation in some existing solutions. In the illustrated example, the hydraulic actuator 180 has been replaced by an electric actuator 280 in order to provide the position 190. The electric actuator 280, however, is fundamentally different than the hydraulic actuator 180, so in typical prior solutions additional modifications are made to the hydraulic actuator system 100, as will be discussed briefly below.

The electric actuator 280 is configured to provide the position 190 based on drive currents. Since neither the controller 110 nor the servo controller 120 are configured to provide the required drive currents, an electric actuator driver 250 is added to the assembly 200. The driver 250 is configured to provide the drive currents used to by electric actuator 280. As is typical with prior electric actuator drivers, the driver 250 is configured to drive the electric actuator based on communicated commands (e.g., digitally transmitted commands), such as controller area network bus (CANbus) communications.

Since neither the servo controller 120 nor the controller 110 are configured for CANbus communications, further modification of the hydraulic actuator system 100 is needed. The servo controller 120 was designed for use with hydraulic actuators, which have very different characteristics than electric actuators. As such, in previous solutions such as the assembly 200, the servo controller 120 is replaced by a communication interface 220 (e.g., a CANbus communications bridge or protocol converter), and the controller 110 is replaced or reprogrammed to become a controller 210. The controller 210 is configured to provide a setpoint 212 as a digital or analog signal, and the communication interface 220 converts the setpoint 212 into a digital signal (e.g., CAN bus command) that can be processed by the driver 250.

Position feedback functions of the electric actuator 280 prompt additional modifications that need to be made to the hydraulic actuator system 100. A sensor 282 provides position feedback, generally in the form of rotary encoder signals (e.g., which are different from the signals provided by the VDT 188). The driver 250 is configured to receive position feedback signals from the sensor 282 and convert them to digital signals (e.g., CANbus). The communication interface 220 converts the digital signals from their transmitted form into digital or analog signals that are readable by a monitor circuit 214 of the modified controller 210.

The example of the assembly 200 presents multiple problems. For example, replacement of the servo controller 120 with the communication interface 220 incurs an additional cost and disruption of the hydraulic actuator system 100. In another example, the controller 110 needs to be replaced or modified to become the controller 210, which also incurs an additional cost and disruption of the hydraulic actuator system 100. In yet another example, the controller 110 and the servo controller 120 may be configured, tuned, verified, and/or validated for use in the hydraulic actuator system 100. Replacement and/or modification of the controller 110 and/or the servo controller 120 can incur unwanted cost and downtime as the assembly 200 is re-configured, re-tuned, re-verified, and/or re-validated before it can be used for its intended purpose. In yet another example, the VDT 188, which provides VDT-type signals, is replaced by the sensor 282, which provides a different type of signal (e.g., encoder signals).

Such upgrades can be prohibitively expensive or disruptive to do so. For example, many older prime mover controls cannot easily be upgraded because it is prohibitively expensive to replace or modernize the entire control system to accommodate the standard 4-20 mA proportional interfaces, or digital interfaces provided on most modern electronic controllers. These older control systems were designed and built to drive a bi-directional hydraulic servo valve and receive feedback from a VDT or other electrical position feedback device on the hydraulic actuator. In addition, safety detection systems in these older controllers are designed to monitor and detect failures of the control system, components of the older hydraulic systems, or interface wiring. Therefore the control system will not function if these safety systems are not satisfied.

The solution provided by the assembly 200 removes some or all of the confidently tuned and historically reliable control algorithms and error checking of the hydraulic actuator system 100, and replaces them with new algorithms and routines that can require tuning, debugging, re-qualification for use in the intended application. Additional steps such as these can make it cost-prohibitive to upgrade an assembly, such as the example hydraulic actuator system 100, to a new control system that can interface with the electronic controller, such as in the example assembly 200. Such invasive upgrades can also present a psychological barrier against performing electric upgrades, for example, by introducing doubt and lack of confidence associated with new systems.

Figure 3:
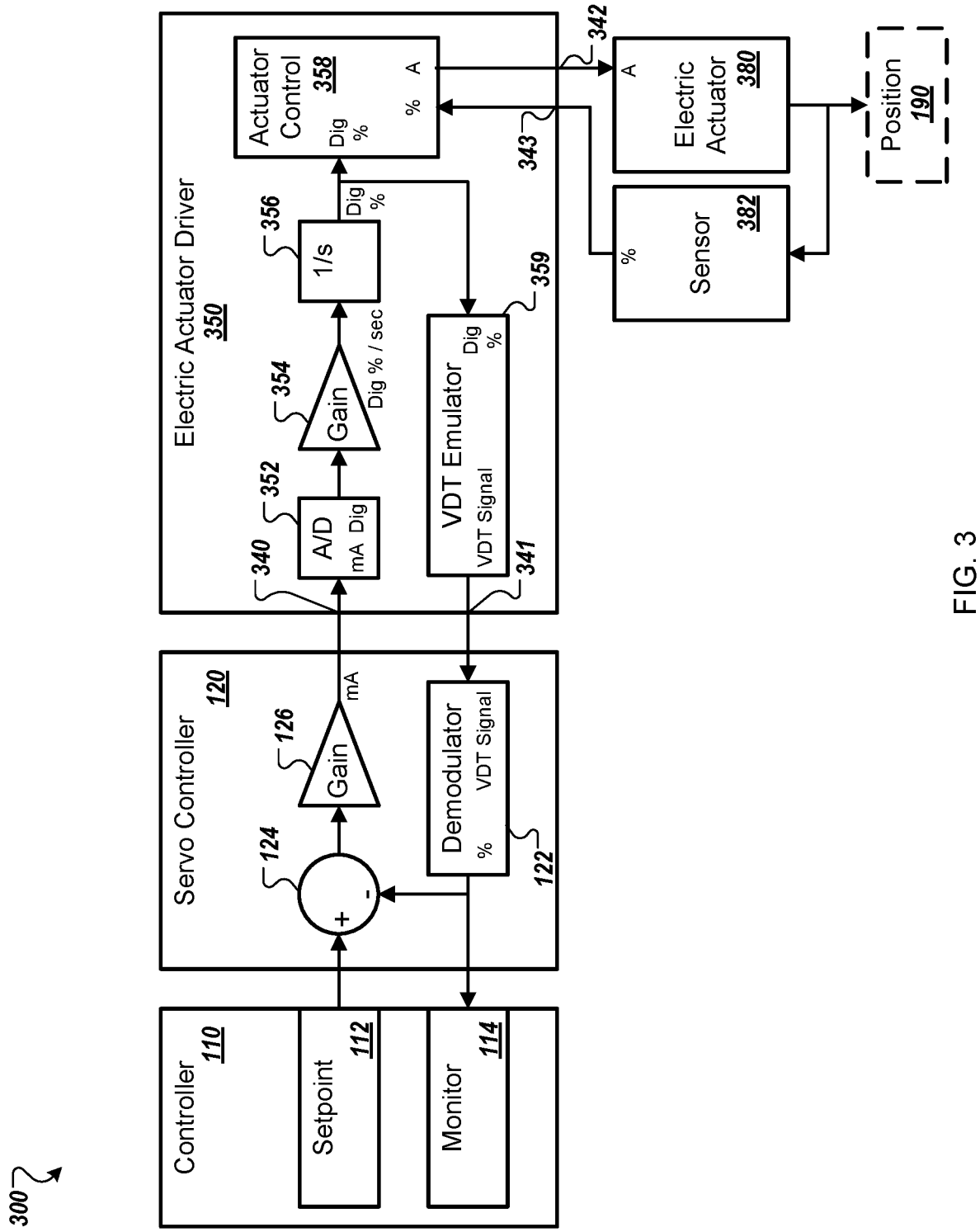
FIG. 3 is a schematic diagram that shows an example electric retrofit assembly.

FIG. 3 is a schematic diagram that shows an example electric retrofit assembly 300. In general, the assembly 300 differs from the assembly 200 of FIG. 2 by preserving a greater portion of the hydraulic actuator system 100 of FIG. 1 after an upgrade to electric actuation. The solution provided by the assembly 300 is to make a high bandwidth reconstruction of the position demand, which is the setpoint to the existing integrating actuator controller 110. This allows the existing position control hardware and control method to be retained and reused. In retrofit projects, the existing control algorithm of the controller 110 has been qualified for use with the existing application, such as fuel control for a particular industrial turbine. The controller 110 has an existing configuration for startup checks, error detection, and tunings for good operational behavior under all anticipated loads, conditions, and input trajectories.

By preserving a greater portion of the hydraulic actuator system 100 and by reducing the number of associated changes and modifications needed to perform the upgrade, the cost and time required to perform the upgrade to the assembly 300 can be considerably lower compared to the assembly 200. In other words, the hydraulic actuator system 100 is a known and proven example, so the more of the hydraulic actuator system 100 than can be retained during a retrofit, the less the cost of the retrofit can be, the less the time needed to perform the retrofit and get the system back online can be, and/or the less the human resistance against such changes may be as well.

The assembly 300 retains the controller 110 and the servo controller 120 during the upgrade. The servo controller 120 is retained to perform position control. The servo controller 120 is designed to drive the hydraulic actuator 180 to match the setpoint signal 112 (e.g., demand) from the controller 110.

The assembly 300 includes an electric actuator 380 (e.g., that replaces the hydraulic actuator 180 of FIG. 1) that provides the position 190, and a sensor 382 (e.g., a rotary encoder) that provides feedback signals based on the position 190. The existing servo controller 120 cannot be used to control the electric actuator 380 directly, for example by using the control loop as a velocity loop instead of position loop, because such an arrangement would present several significant problems.

For example, controller 110, as a full closed loop positioner that is already in use, may already be qualified for use with existing industrial gas turbines. The position control loop may not have a separate velocity loop, and many controller algorithms are built around position control functionality, so it would be a major redesign to change the controller 110 from position-based control to velocity-based control. In another example, some of electric actuators have high inertia, and would become unstable or overshoot badly on large steps if the existing servo controller 120 was tuned to the desired bandwidth. Such overshoot can be due to the high forces that may be required to stop the actuator quickly. Electric actuators have limited stopping force because of drive current limits, whereas these types of considerations are already solved in the existing controller 110 and the servo controller 120 for position control of the hydraulic actuator 180. In yet another example, requalification on each model of electric actuator may be needed if the main control loop of the controller 110 were redesigned.

Since the servo controller 120 was designed for use with hydraulic actuators, which have very different characteristics when compared to electric actuators, the assembly 300 also includes an electric actuator driver 350. The electric actuator driver 350 is a conversion circuit configured to adapt the servo controller 120 for use with the electric actuator 380, as will be described in more detail below.

The output of the servo controller 120 is proportional to velocity, and the electric actuator driver 350 is used as a velocity control. The controller 110 provides the position setpoint signal 112 to the servo controller 120, which converts the position setpoint signal 112 to the analog output (e.g., typically +10 mA to −10 mA). The analog output of the servo controller 120 is received at an input port 340 that is in electrical communication with an analog-to-digital converter (ADC) 352 (e.g., an analog to digital conversion stage) of the electric actuator driver 350. The ADC 352 converts the analog output of the servo controller 120 into a digital signal.

The electric actuator driver 350 includes a setpoint identification module 354. The digital signal provided by the servo controller 120 is received by the setpoint identification module 354, and the setpoint identification module 354 performs a setpoint identification algorithm based on the digital signal from the ADC 352. The setpoint identification algorithm emulates the behavior of a hydraulic actuator (e.g., the hydraulic actuator 180) and has a structure similar to a dynamic model of a hydraulic actuator, so that the servo controller 120 will drive a setpoint identification integrator 356 (e.g., an integrator stage) to match the position setpoint signal 112 (e.g., demand) provided by the controller 110.

The output of the setpoint identification integrator 356 is a digital position signal. The digital position signal is received by an electric actuator controller 358 (e.g., an actuator controller stage) to determine one or more drive currents (e.g., motor coil currents) that are provided to the electric actuator 380, through an output port 342, to actuate the electric actuator 380 and, in turn, drive the position 190. Position feedback signals (e.g., encoder signals) are provided by the sensor 382 to an input port 343 that is in electrical communication with the electric actuator controller 358. The electric actuator controller 358, receives and uses the feedback signals from the sensor 382 and the digital position signal to perform closed loop control of the electric actuator 380.

The setpoint identification technique allows the existing integrating actuator control device to interface to the electric actuator 380. In some implementations, the solution provided by the assembly 300 provides the advantages of a modern electronic actuator controller without an expensive (e.g., possibly multi-million dollar) turbine control update.

In some implementations, disturbance rejection can be increased by configuring the control bandwidth of the electric actuator driver 350 to be higher than the desired actuator bandwidth. In some embodiments, a reference filter (e.g., a lead-lag filter stage) can be used to achieve the desired actuator bandwidth. In some implementations, in order to get the desired overall bandwidth with the setpoint identification algorithm of the setpoint identification module 354, the reference filter can be bypassed or increased to a higher bandwidth, such that the existing reference filter dynamics are replaced by the series dynamics of the loop formed by the servo controller 120 and the setpoint identification algorithm. In some implementations, a proportional gain can be added in parallel with the setpoint identification integrator 356 to achieve the desired bandwidth. A similar effect can be achieved with a lead-lag filter stage in series with the setpoint identification integrator 356. In some implementations, a PI or PID control algorithm can be mathematically configured to provide an equivalent integrator function, or an equivalent integrator plus lead-lag function.

The electric actuator driver 350 is also configured to provide feedback signals at an output port 341 in order to maintain backward compatibility with the servo controller 120. Since the electric actuator controller 358 is performing closed-loop control of the electric actuator 380 based on feedback signals provided by the sensor 382, and those feedback signals are not of a type that can be used by the servo controller 120 (e.g., encoder signals instead of VDT signals), those position feedback signals are not provided to servo controller 120. Instead, the digital position signal provided by the setpoint identification integrator 356 is also provided to a VDT emulator 359.

The feedback signals from VDTs (e.g., the VDT 188) can have either a single sinusoidal voltage (e.g., carrier signal), where the amplitude rises with increasing position, or two outputs, one with voltage amplitude which rises with increasing position and the other sinusoidal voltage amplitude decreases with increasing position. The VDT emulator 359 can be configured to emulate either type of VDT signal based on the digital position signal provided by the setpoint identification integrator 356, and provide the emulated signal at the output port 341. The servo controller 120 receives the emulated VDT signal, wherein the demodulator 122 demodulates the signal into a form that can be summed by the summing node 124 to close and retain the control loop of the servo controller 120. The demodulated signal is also provided to the monitor circuit 114 of the controller 110 to retain the existing functions of the monitor circuit 114 and to retain the existing operations of the controller 110 that are based on those functions.

In some embodiments, the emulated signal may have a single signal that varies with position (e.g., proportional or inversely), or may have one signal that is proportional to position and another signal that inversely proportional to position, or may provide a sine signal and a cosine signal that are proportional to position. In some embodiments, the feedback signal can be configured as a four-wire configuration that resembles a VDT signaling configuration. For example, the wiring can include two excitation wires and two feedback wires. In another example, the wiring can include six wires, with four feedback wires (e.g., both proportional and inverse).

In some implementations, fault, shutdown, and/or other types of information about the electric actuator driver 350 and/or the electric actuator 380 may be provided. For example, the electric actuator driver 350 may include discrete outputs that can be used to communicate alarm, fault, or other types of conditions (e.g., to external or remote monitoring system implemented along with the retrofit). In another example, such as when the setpoint identification is not being used, or the setpoint identification integrator 356 is being driven hard into a stop, the emulated VDT feedback can be switched from the setpoint identification integrator 356 to actual position. In some implementations, setpoint identification may not be used when the electric actuator driver 350 has identified a problem and/or has tripped (e.g., a shutdown condition). In another example, the setpoint identification integrator 356 can be limited to within a defined window around actual position, in which the window size can be large enough to achieve substantially full dynamic performance of the electric actuator 380.

Figure 4:
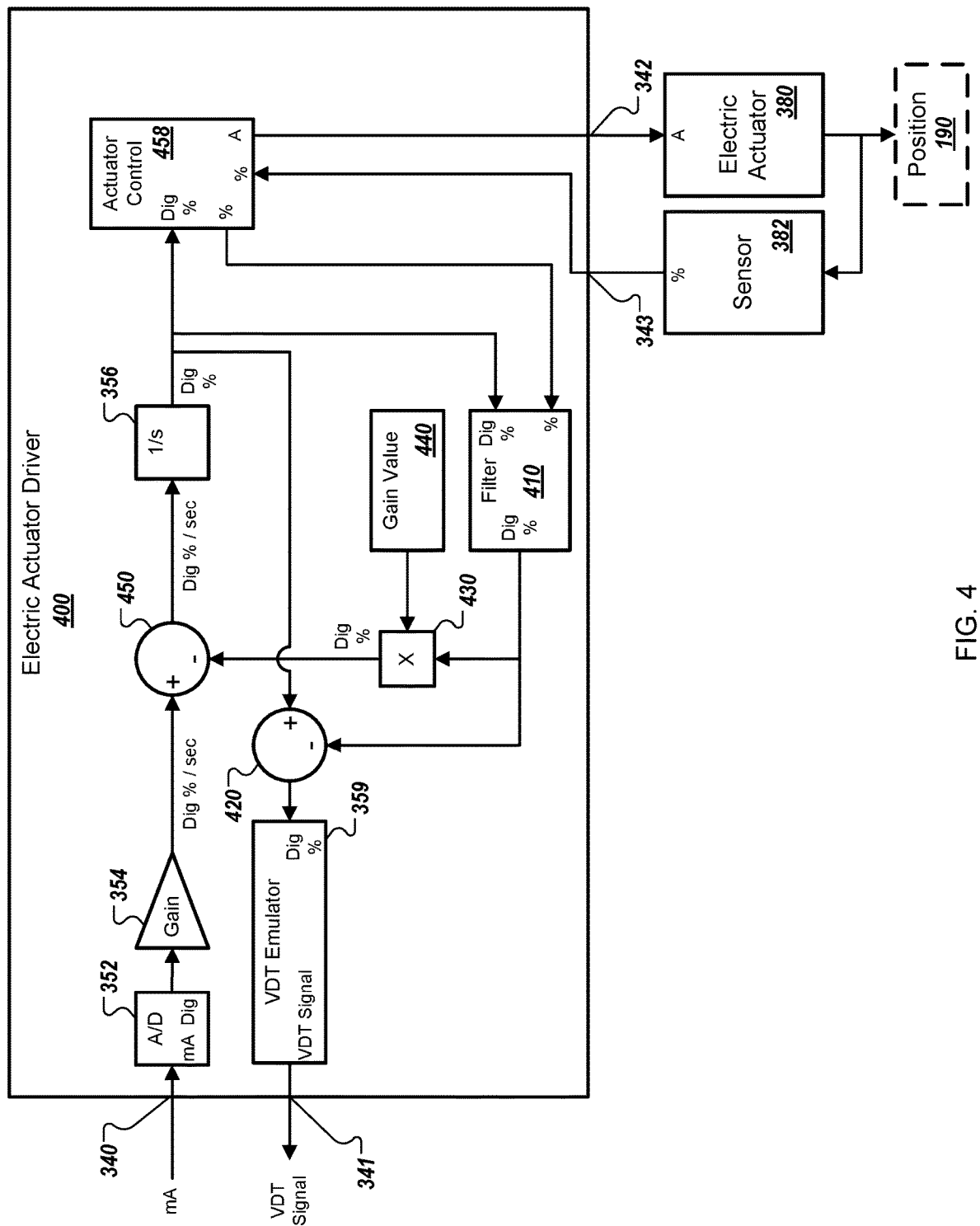
FIG. 4 is a schematic diagram that shows an example electric actuator driver.

FIG. 4 is a schematic diagram that shows another example electric actuator driver 400 (e.g., a conversion circuit configured to adapt the servo controller 120 to the electric actuator 380). In some embodiments, the electric actuator driver 400 can used in place of, or can be a modification of, the example electric actuator driver 350 of FIG. 3. The electric actuator driver 400 retains the example ADC 352, the example setpoint identification module 354, the example setpoint identification integrator 356, the example sensor 382, and the example VDT emulator 359 to control the electric actuator 380 and the position 190. The electric actuator controller 358 is modified to become an electric actuator controller 458 by including an additional position feedback output that is configured to provide position feedback signals based on feedback provided by the sensor 382. In some implementations, the electric actuator controller 358 can be retained, and position feedback signals can be obtained directly from the position sensor 382.

In general, the electric actuator driver 400 is configured to provide fault information (e.g., to report servo control problems or other problems with the electric actuator 380) to the controller 110 through a modified application of the emulated VDT feedback signals that are backward-compatible with the servo controller 120 and the monitor circuit 114.

One example of a type of fault that can be communicated are gross errors, which can occur when the electric actuator 380 is stuck or for any reason cannot follow the commands of the electric actuator controller 358. This type of fault may need to be identified quickly so that the prime mover can be shut down. For example, a fault may be indicated after 3 seconds of >3% error, and can trip after 5 seconds of >5% error.

Another example of a type of fault that can be communicated are small errors, where the position error is outside of a predetermined tolerance. For example, in an implementation in which the electric actuator 380 controls delivery of fuel (e.g., to a turbine), a positional error may become large enough to consider the delivery of fuel flow to be out of tolerance, and this error can cause higher emissions (e.g., pollution) or potential for lean combustion which can be unstable or cause prime mover damage. A traditional cause of these errors (e.g., as might be experienced with the hydraulic actuator system 100 of FIG. 1) is a shift in the null current of the hydraulic servo valve 182, combined with the (e.g., proportional-only) servo controller 120. Electric actuation systems, such as the example assembly 300 and the example electric actuator driver 400 are not as prone to small errors (e.g., less than about 3% error), but detectability of these errors may be desired or required for historical reasons (e.g., such error detection may have been considered essential prior to the retrofit, because such small errors can be a common occurrence with hydraulic actuators), and there may be other potential causes of small errors that may be useful if detected. For example, in an implementation in which the electric actuator 380 controls delivery of fuel (e.g., to a turbine), an obstruction or unexpected movement of a fuel valve away from a commanded fully closed position can result in leakage into the fuel system. Such leakage can prompt a need for initiation of a purging sequence, in which fuel is blown out of the lines downstream to prevent a dangerous fuel mixture from accumulating in downstream piping.

The electric actuator driver 400 provides fault detection and communication by implementing a detection algorithm in combination with the setpoint identification algorithm. The detectability algorithm modifies the setpoint identification algorithm so that steady state feedback to the servo controller 120 is asymptotic to actual position, and demand to the electric actuator 380 is asymptotic to demand from the controller 110. Transiently, feedback to the servo controller 120 can be closer to actual position than without the detectability algorithm.

The detectability algorithm is perform based on several functions represented in FIG. 4. A position error between the output of the setpoint identification integrator 356 and the actual position output by the electric actuator controller 358 is filtered by a filter 410 (e.g., a lead-lag filter stage). The filtered error signal provided by the filter 410 is subtracted from the signal provided by the setpoint identification integrator 356 by a summing node 420 in the feedback path to the servo controller 120. The filtered error is multiplied by a gain stage 430 (e.g., a proportional gain stage) based on a predetermined gain value 440, and is subtracted from the forward path (e.g., upstream of the setpoint identification integrator 356) by a summing node 450.

During large transients, such as a when a large step occurs in the position setpoint signal 112, there is transiently a large error between the setpoint and actual position. This is normal behavior and will be ignored by the controller's 110 existing (e.g., pre-retrofit) position error detection algorithms. Therefore, the detectability algorithm does not need to make the emulated VDT feedback signal exactly match actual position during transients.

During some examples of steady state conditions, it can be important to make the emulated VDT feedback signal closely match the actual position, and it can be desirable to converge toward actual position rapidly, for example, to minimize the detection time during hard failures.

Because some existing servo controllers, such as the servo controller 120, are commonly of proportional-only designs, an offset in the forward path will create a steady state error between VDT feedback and the setpoint signal 112 from the controller 110. An offset in the feedback path will not cause an error between VDT feedback and the setpoint signal 112 from the controller 110. Instead, an offset in the feedback path will cause a corresponding shift in the setpoint identification integrator 356. If the feedback is offset by the error between the setpoint identification integrator 356 and the actual position, and the forward path is offset by the same error, multiplied by the predetermined gain value 440, then demand to the electric actuator driver 400 will be asymptotic to the setpoint signal 112 from the controller 110, and the emulated VDT feedback to the servo controller 120 will be asymptotic to actual position.

In some implementations, the predetermined gain value 440 can be the forward path gain, between the servo controller 120 position error (e.g., the setpoint signal 112 minus feedback) and the point where the forward path offset is subtracted from the forward path. In some implementations, the subtraction could be downstream relative to the setpoint identification module 354 (e.g., as shown in the illustrated example), or downstream of the setpoint identification module 354.

In some examples, if position error between the setpoint identification integrator 356 and the actual position is not filtered, dynamic behavior of the electric actuator 380 may be adversely affected. In some examples, excessive filtering can delay detection of position tracking problems. Appropriate design of the filter 410 can balance or improve the performance of the detectability algorithm, but the detectability algorithm will work across a broad variety of filter designs, or even in embodiments in which the filter 410 is omitted or configured to have no effect. In some implementations, the filter 410 can be omitted.

In some implementations, the filter 410 can be a linear filter, for example, an infinite impulse response (IIR) filter or a finite impulse response (FIR) filter. In some implementations, the filter 410 can be configured to for limited magnitude, for example, so that there would be less filter movement in response to large steps.

In some implementations, the filter 410 can be configured to filter the difference between the reference filter and actual position. Although the reference filter can be set to a very high frequency when using the setpoint identification algorithm, the slew rate limits may still remain active. This can reduce filter movement during large steps on slower actuators.

In some implementations, the filter 410 can be a nonlinear filter, for example, by being configured to use higher gains when decaying than when growing in magnitude (e.g., to more quickly reject large transient errors). In some implementations, the filter 410 can be configured to provide higher gain when the electric actuator 380 is not moving (e.g., to allow more rapid identification of a stuck actuator).

In some implementations, the filter 410 can be configured to provide multiple filter paths. For example, the filter 410 can be configured with multiple, different filters designed for rapid detection under different fault scenarios. The filter path to be used could be selected based on actuator type, or it could be determined dynamically. In some implementations, the filter 410, the summing node 420, the gain stage 430, and the summing node 450 can be considered to be a modification stage configured to modify the position signal provided by the setpoint identification integrator 356.

Figure 5:
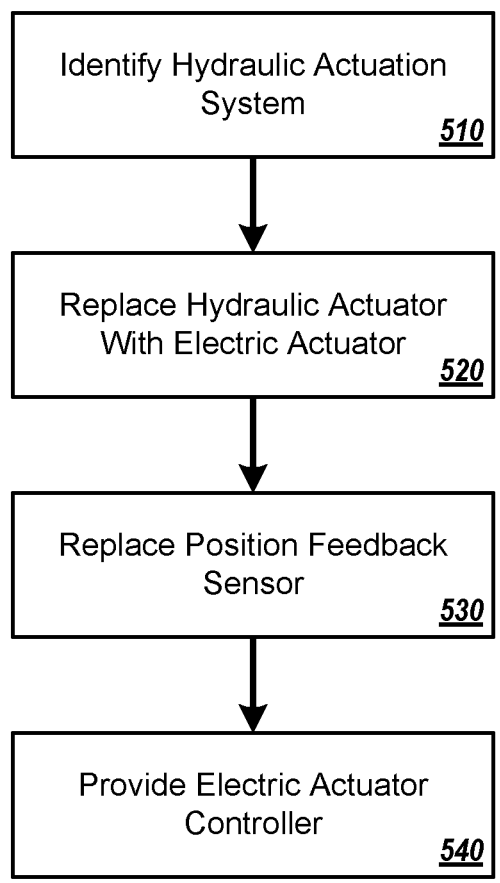
FIG. 5 is a flow diagram of an example process for retrofitting an electric actuator into a hydraulic actuator system.

FIG. 5 is a flow diagram of an example process 500 for retrofitting an electric actuator into a hydraulic actuator system. For example, the process 500 can be used to retrofit the electric actuator 380 and electric actuator driver 350 into the hydraulic actuator system 100 of FIG. 1 to become the example assembly 300 of FIG. 3.

At 510, a hydraulic actuation system is identified. The hydraulic actuation system includes a hydraulic servo controller circuit configured to provide an analog electrical servo control signal based on a first position feedback signal, a hydraulic actuator configured to receive the analog electrical servo control signal and actuate based on the analog electrical servo control signal, and a first position feedback sensor configured to provide the first feedback signal based on a positional configuration of the hydraulic actuator. For example, the example hydraulic actuator system 100 can be identified, and the hydraulic actuator system 100 includes the servo controller 120 which is configured to control the hydraulic actuator 180 and receive feedback from the VDT 188 or other position feedback sensor. In some implementations, the first position feedback signal can be configured as an alternating current feedback signal, such as a signal that emulates the signals provided by a VDT.

At 520, the hydraulic actuator is replaced with an electric actuator configured to actuate based on one or more electric motor coil control currents. For example the hydraulic actuator 180 can be replaced by the example electric actuator 380.

At 530, the first position feedback sensor is replaced with a second position feedback sensor configured to provide a second position feedback signal based on a positional configuration of the electric actuator. For example, the VDT 188 can be replaced by the sensor 382.

At 540, an electric actuator driver is provided. The electric actuator driver is configured to (i) provide the one or more electric motor coil control currents based on the analog electrical servo control signal and the second position feedback signal, and (ii) provide the first feedback signal to the hydraulic servo controller based on the analog electrical servo control signal. For example, the electric actuator driver 350 is provided, and is configured to drive the electric actuator 380 based on the output of the servo controller and feedback from the sensor 382, and provide the output of the VDT emulator 359 to the demodulator 122.

In some embodiments, the first feedback signal can be emulative of a variable displacement transformer feedback signal. For example, the VDT emulator 359 is configured to provide a feedback signal in a format that resembles a VDT signal, such as the signal provided by the VDT 188.

In some embodiments, the first feedback signal can include at least one of a first sinusoidal voltage signal having an amplitude that is proportional to the analog electrical servo control signal, and a second sinusoidal voltage signal having an amplitude that is inversely proportional to the analog electrical servo control signal. For example, the emulated VDT signals output by the VDT emulator 359 can include a first sinusoidal voltage signal having an amplitude that is proportional to the analog electrical servo control signal received by the ADC 352 (e.g., after further processing by the setpoint identification module 354 and the setpoint identification integrator 356), and a second sinusoidal voltage signal having an amplitude that is inversely proportional to the analog electrical servo control signal received by the ADC 352 (e.g., after further processing by the setpoint identification module 354 and the setpoint identification integrator 356).

In some embodiments, the analog electrical servo control signal can be configured as a hydraulic servo valve control signal. In the illustrated example, the electric actuator driver 350 is configured to receive the control signals provided by the servo controller 120. In the illustrated example, the control signal provided by the servo controller 120 is a hydraulic servo valve control signal that is configured to control the hydraulic servo valve 182.

In some embodiments, the electric actuator driver can be further configured to convert the analog electrical servo control signal to a digital signal representative of the analog electrical servo control signal, modify the digital signal based on at least one of (i) increasing a gain of the digital signal and (ii) filtering the digital signal, integrate the modified signal, provide the feedback signal based on the integrated signal, and provide the one or more electric motor coil control currents based on the integrated signal and the position feedback signal. For example, the example electric actuator driver 400 can receive the control signals from the servo controller 120 at the ADC 352 that converts the analog signals to digital signals, and can modify the digital signals based on feedback signals provided by the gain stage 430, the filter 410, or both, in which the setpoint identification integrator 356 can integrate the modified signal. The modified signal can be provided to the VDT emulator 359 to produce the emulated VDT signals, and the modified signal can be provided to the electric actuator controller 358 to produce motor coil currents that can drive the electric actuator 380.

In some implementations, determining a feedback signal based on the analog electrical servo control signal can include determining a difference between an actual position, based on the position feedback signal, and a commanded position, based on the analog electrical servo control signal. For example, the summing node 420 can determine a difference between commanded position, which is based on analog servo control signals received by the ADC 352, and the position 190 as provided by the sensor 382.

Figure 6:
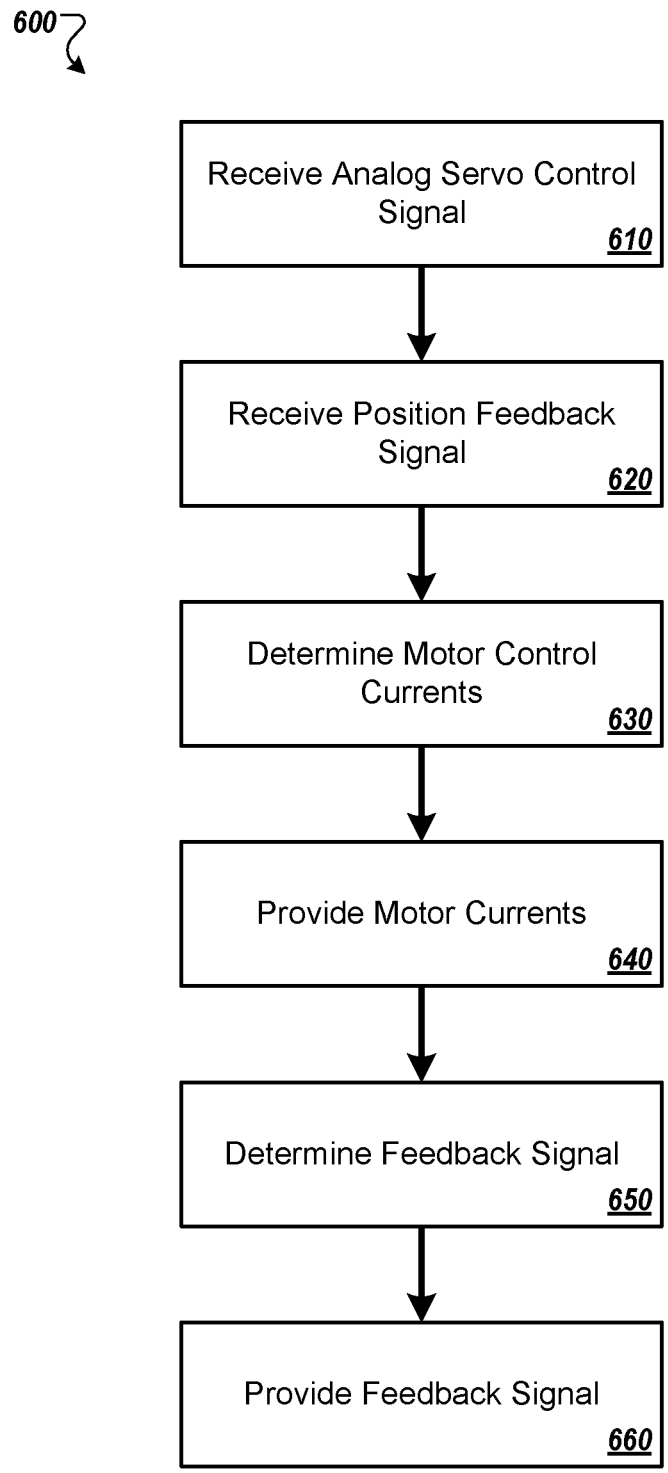
FIG. 6 is a flow diagram of an example process for controlling an electric actuator in a hydraulic actuator system.

FIG. 6 is a flow diagram of an example process 600 for controlling an electric actuator that has been retrofitted into a hydraulic actuator system. In some implementations, the process 600 can be performed by the example electric actuator driver 350 of FIG. 3, or by the example electric actuator driver 400 of FIG. 4.

At 610, an analog electrical servo control signal is received. For example, the ADC 352 can receive the output of the servo controller 120. That output is an analog electrical servo control signal.

In some implementations, the analog electrical servo control signal can be configured as a hydraulic servo valve control signal. For example, the servo controller 120 is configured to output a signal that is configured to control the hydraulic servo valve 182. In some implementations, the analog electrical servo control signal can be an analog electrical current that varies in a range from about −10 mA to about +10 mA. For example, some servo valves (e.g., the hydraulic servo valve 182) are configured to be controlled based on electrical currents that can range from about −10 mA to +10 mA.

At 620, a position feedback signal is received. For example, the electric actuator controller 358 can receive position feedback signals from the sensor 382.

At 630, one or more electric motor coil control current levels are determined based on the analog electrical servo control signal and the position feedback signal. For example, the digital position signal provided by of the setpoint identification integrator 356, which is based on the analog servo control signal provided by the servo controller 120, can be used by the electric actuator controller 358 along with the position feedback signal provided by the sensor 382 to determine one or more motor coil currents that can be provided to the electric actuator 380.

At 640, the one or more electric motor coil control currents are provided based on the determined electric motor coil control current levels. For example, the electric actuator driver 350 can provide the determined electric currents to motor coils of the electric actuator 380.

At 650, a feedback signal can be determined based on the analog electrical servo control signal. For example, the VDT emulator 359 can determine a feedback signal that is in a format that resembles a VDT signal based on the output of the setpoint identification integrator 356.

In some implementations, determining the feedback signal based on the analog electrical servo control signal can include determining a difference between an actual position, based on the position feedback signal, and a commanded position, based on the analog electrical servo control signal. For example, the example electric actuator controller 400 of FIG. 4 can be configured to provide emulated VDT signals to the servo controller 120 based on a difference between the target position represented by the output of the setpoint identification integrator 356 and the sensed position represented by the output of the filter 410, that can be determined by the summing node 420.

At 660, a feedback signal is based on the determined feedback signal. For example, the VDT emulator 359 can output an alternating current feedback signal (e.g., an emulated VDT signal) based on the determined feedback signal. In the illustrated example of FIG. 3, the emulated signal is provided as feedback to the servo controller 120. In another example, the feedback signal can be emulative of a direct current position feedback signal.

In some implementations, the feedback signal can be an alternating current feedback signal that is emulative of a variable displacement transformer feedback signal. For example, the VDT emulator 359 can provide an emulated VDT signal (e.g., to the servo controller 120). In some implementations, the feedback signal can be at least one of a first sinusoidal voltage signal having an amplitude that is proportional to the analog electrical servo control signal, and a second sinusoidal voltage signal having an amplitude that is inversely proportional to the analog electrical servo control signal.

Figure 7:
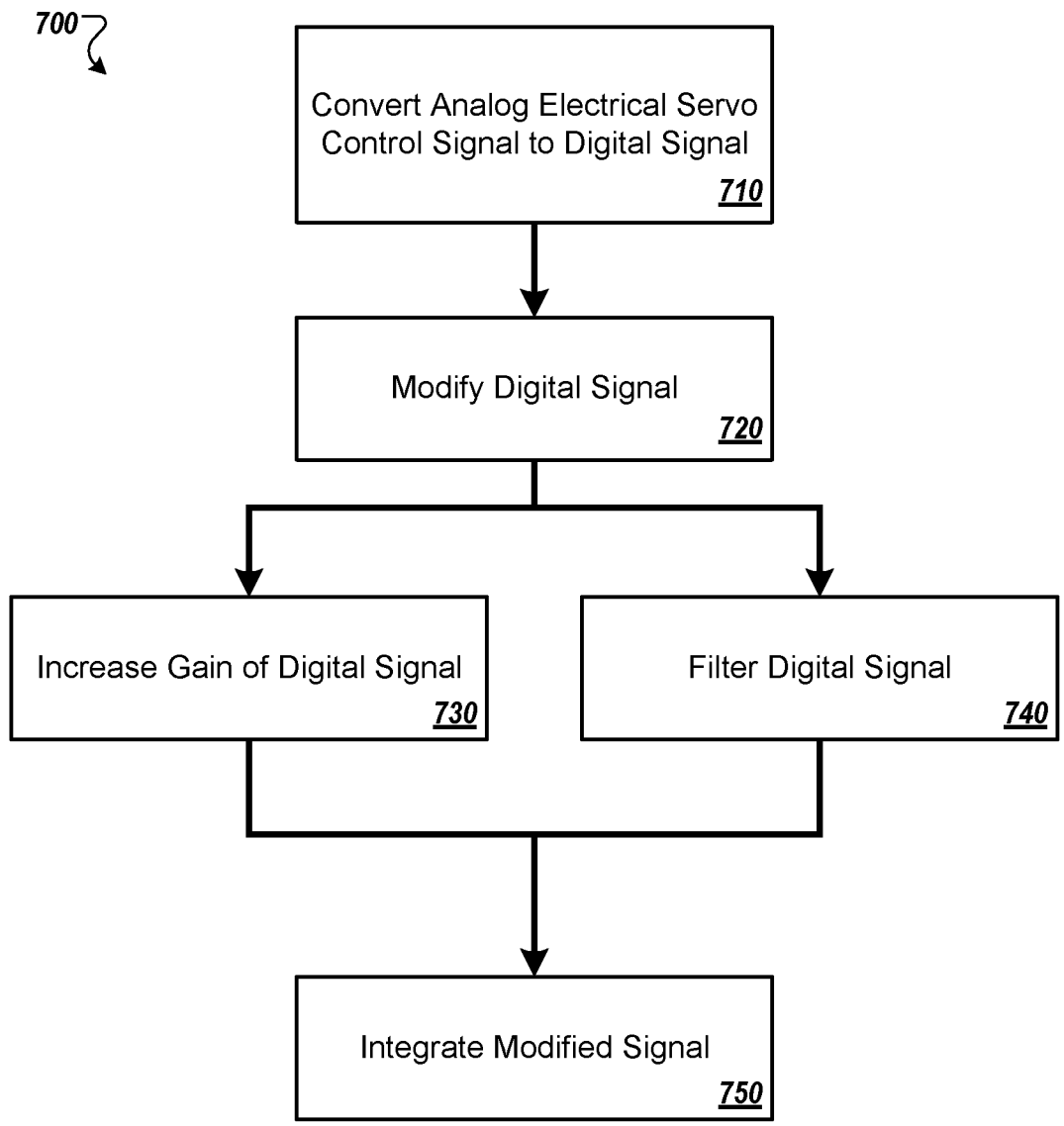
FIG. 7 is a flow diagram of an example process for emulating hydraulic feedback signals by an electric actuator system retrofitted into a hydraulic actuator system.

FIG. 7 is a flow diagram of an example process for emulating hydraulic feedback signals by an electric actuator system retrofitted into a hydraulic actuator system. In some implementations, the process 700 can be performed by the example electric actuator driver 400 of FIG. 4.

At 710, an analog electrical servo control signal is converted to a digital signal representative of the analog electrical servo control signal. For example, the ADC 352 converts the analog servo control signal provided by the servo controller 120 into a digital signal that is provided to the setpoint identification module 354. The digital position output of the setpoint identification integrator 356 is based on the digital signal provided by the ADC 352.

At 720, the digital signal is modified based on at least one of (i) increasing a gain of the digital signal at 730, and (ii) filtering the digital signal at 740. For example, the gain stage 430 can amplify or attenuate the output of the setpoint identification integrator 356 based on the predetermined gain value 440, and a difference between the resulting signal and the digital signal can be determined by the summing node 450. In another example, the filter 410 can filter the output of the setpoint identification integrator 356 based on position feedback provided to the electric actuator controller 458, or from the sensor 382, and a difference between the filtered signal and the digital position signal can be determined by the summing node 420.

At 750, the modified signal is integrated. For example, the setpoint identification integrator 356 can integrate the output of the setpoint identification module 354.

Figure 8:
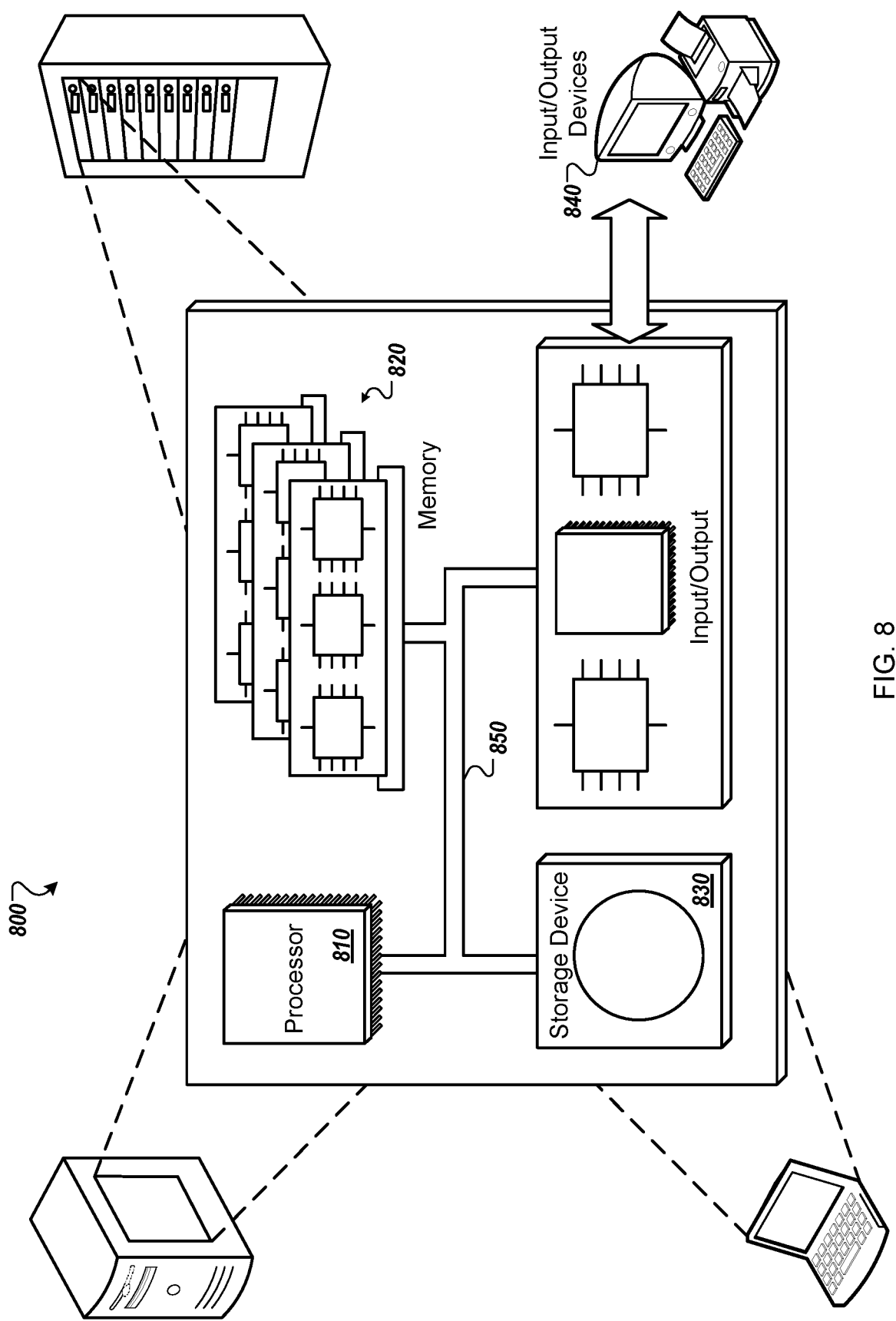
FIG. 8 is a schematic diagram of an example generic computer system.

FIG. 8 is a schematic diagram of an example of a generic computer system 800. The system 800 can be used for the operations described in association with the processes 600 and/or 700 according to some implementations. For example, the system 800 may be included in either or all of the controller 110, the electric actuator driver 350, and the electric actuator driver 400.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An electric actuator driver comprising:
a first input port configured to receive an analog electro-hydraulic servo valve control signal;
a second input port configured to receive an actuator position feedback signal;
a first output port;
a second output port; and
a conversion circuit configured to:
  determine one or more electric motor coil control current levels based on the analog electrohydraulic servo valve control signal and the actuator position feedback signal;
  provide the one or more electric motor coil control currents based on the determined electric motor coil control current levels at the first output port;
  determine a feedback signal emulative of a variable displacement transformer feedback signal and based on the analog electrohydraulic servo valve control signal; and
  provide the determined feedback signal at the second output port.

2. The electric actuator driver of claim 1, wherein the feedback signal is an alternating current feedback signal that is emulative of a variable displacement transformer feedback signal.

3. The electric actuator driver of claim 1, wherein the feedback signal comprises at least one of a first sinusoidal voltage signal having an amplitude that is proportional to the analog electrical servo control signal, and a second sinusoidal voltage signal having an amplitude that is inversely proportional to the analog electrical servo control signal.

4. The electric actuator driver of claim 1, wherein the analog electrical servo control signal is configured as a hydraulic servo valve control signal.

5. The electric actuator driver of claim 1, wherein the analog electrical servo control signal is an analog electrical current that varies in a range from about −10 mA to about +10 mA.

6. The electric actuator driver of claim 1, wherein the conversion circuit comprises:

an analog to digital conversion stage configured to convert the analog electrical servo control signal to a digital signal representative of the analog electrical servo control signal;
an integrator stage configured to integrate the digital signal;
an emulator configured to provide the feedback signal based on the integrated signal; and
an actuator controller stage configured to provide the one or more electric motor coil control currents based on the integrated signal and the position feedback signal.

7. The electric actuator driver of claim 1, wherein the feedback signal is determined further based on a difference between an actual position, based on the position feedback signal, and a commanded position, based on the analog electrical servo control signal.

8. A method of actuator control, comprising:
receiving an analog electrohydraulic servo valve control signal;
receiving an actuator position feedback signal;
determining one or more electric motor coil control current levels based on the analog electrohydraulic servo valve control signal and the actuator position feedback signal;
providing the one or more electric motor coil control currents based on the determined electric motor coil control current levels;
determining a feedback signal emulative of a variable displacement transformer feedback signal and based on the analog electrohydraulic servo valve control signal; and
providing the determined feedback signal.

9. The method of claim 8, wherein the feedback signal is an alternating current feedback signal that is emulative of a variable displacement transformer feedback signal.

10. The method of claim 8, wherein the feedback signal comprises at least one of a first sinusoidal voltage signal having an amplitude that is proportional to the analog electrical servo control signal, and a second sinusoidal voltage signal having an amplitude that is inversely proportional to the analog electrical servo control signal.

11. The method of claim 8, wherein the analog electrical servo control signal is configured as a hydraulic servo valve control signal.

12. The method of claim 8, wherein the analog electrical servo control signal is an analog electrical current that varies in a range from about −10 mA to about +10 mA.

13. The method of claim 8, further comprising:
converting the analog electrical servo control signal to a digital signal representative of the analog electrical servo control signal;
integrating the digital signal;
providing the feedback signal based on the integrated signal; and
providing the one or more electric motor coil control currents based on the integrated signal and the position feedback signal.

14. The method of claim 8, wherein determining a feedback signal based on the analog electrical servo control signal comprises determining a difference between an actual position, based on the position feedback signal, and a commanded position, based on the analog electrical servo control signal.

15. A method of actuator control comprising:
identifying a hydraulic actuation system comprising:

a hydraulic servo controller circuit configured to provide an analog electrical servo control signal based on a first position feedback signal;

a hydraulic actuator configured to receive the analog electrical servo control signal and actuate based on the analog electrical servo control signal; and a first position feedback sensor configured to provide the first position feedback signal based on a positional configuration of the hydraulic actuator;

replacing the hydraulic actuator with an electric actuator configured to actuate based on one or more electric motor coil control currents;

replacing the first position feedback sensor with a second position feedback sensor configured to provide a second position feedback signal based on a positional configuration of the electric actuator; and providing an electric actuator driver configured to:
  (i) provide the one or more electric motor coil control currents based on the analog electrical servo control signal and the second position feedback signal; and
  (ii) provide the first position feedback signal to the hydraulic servo controller circuit based on the analog electrical servo control signal.

16. The method of claim 15, wherein the first position feedback signal is emulative of a variable displacement transformer feedback signal.

17. The method of claim 15, wherein the first position feedback signal comprises at least one of a first sinusoidal voltage signal having an amplitude that is proportional to the analog electrical servo control signal, and a second sinusoidal voltage signal having an amplitude that is inversely proportional to the analog electrical servo control signal.

18. The method of claim 15, wherein the analog electrical servo control signal is configured as a hydraulic servo valve control signal.

19. The method of claim 15, wherein the electric actuator driver is further configured to:
  convert the analog electrical servo control signal to a digital signal representative of the analog electrical servo control signal;
  integrate the digital signal;
  provide the feedback signal based on the integrated signal; and
  provide the one or more electric motor coil control currents based on the integrated signal and the second position feedback signal.

20. The method of claim 15, wherein determining a feedback signal based on the analog electrical servo control signal comprises determining a difference between an actual position, based on the position feedback signal, and a commanded position, based on the analog electrical servo control signal.

* * * * *